J. W. ENRIGHT.
RESILIENT WHEEL.
APPLICATION FILED NOV. 26, 1910.
1,018,307.
Patented Feb. 20, 1912.
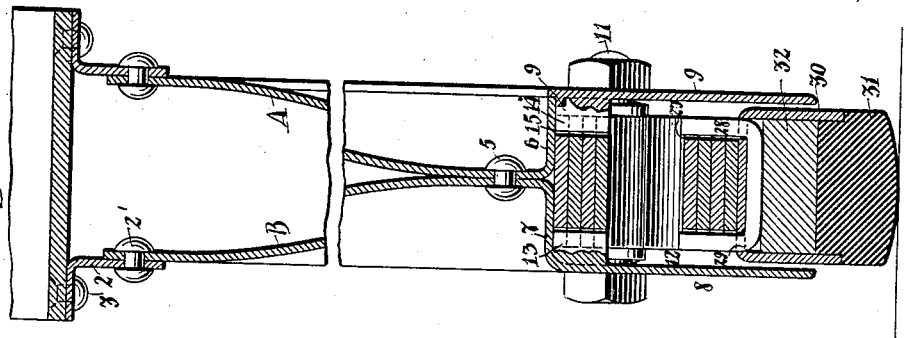
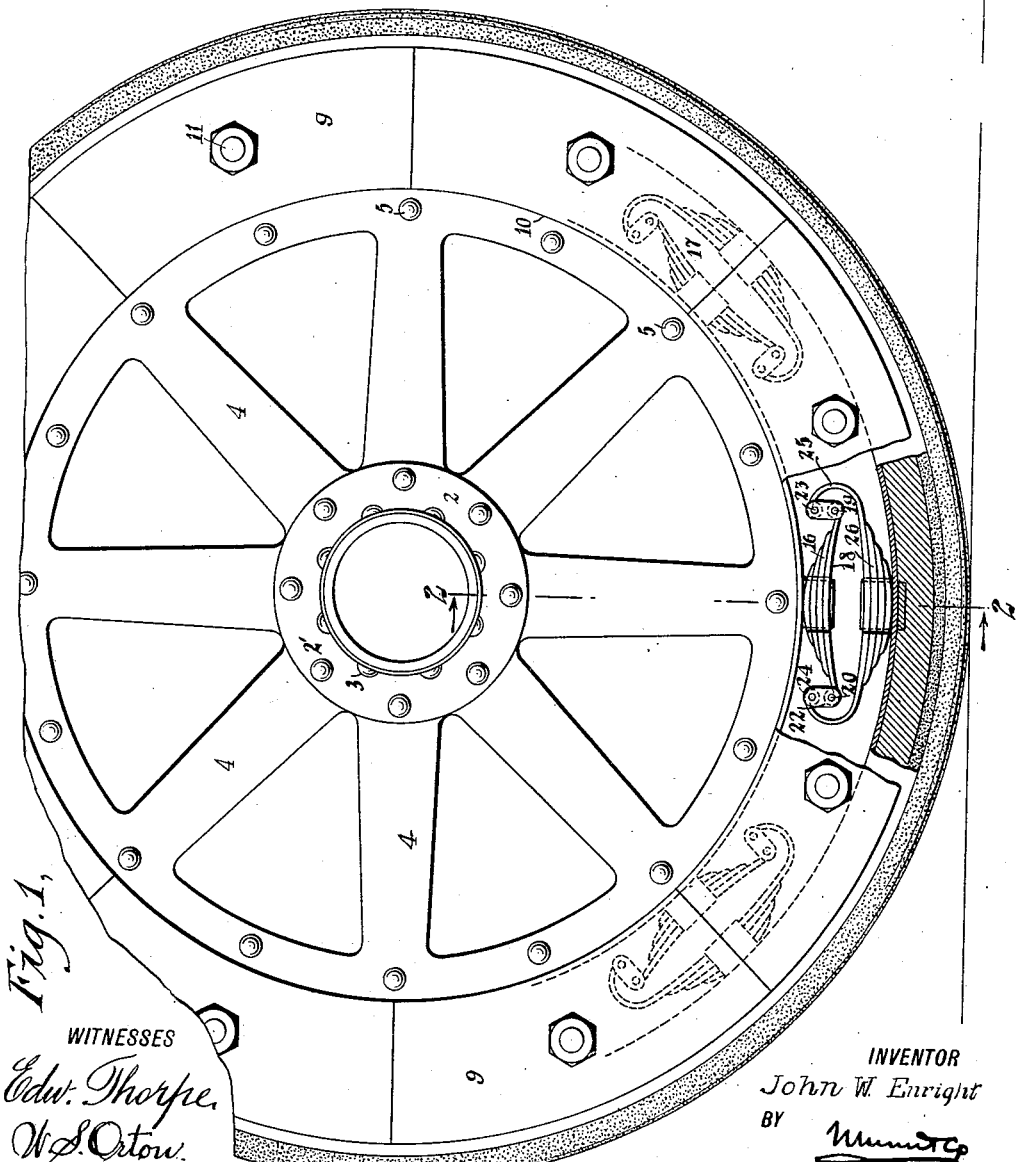
WITNESSES
Edw. Thorpe.
W. S. Orton.
INVENTOR
John W. Enright
BY
ATTORNEYS

UNITED STATES PATENT OFFICE.

JOHN WOOD ENRIGHT, OF NEW ORLEANS, LOUISIANA.

RESILIENT WHEEL.

1,018,307.   Specification of Letters Patent.   Patented Feb. 20, 1912.

Application filed November 26, 1910. Serial No. 594,284.

*To all whom it may concern:*

Be it known that I, JOHN W. ENRIGHT, a citizen of the United States, and a resident of New Orleans, in the parish of Orleans and State of Louisiana, have invented a new and Improved Resilient Wheel, of which the following is a full, clear, and exact description.

My invention relates to improvements in elastic tires or rims for the wheels of motor cars, carriages and other road vehicles, and one object of my invention is to make the tires elastic, resilient, and more durable and efficient than the elastic tires heretofore made.

A further object is to provide a wheel of that character which will serve all the purposes of a vehicle wheel provided with the usual pneumatic tire, by imparting thereto smooth and easy riding, and, at the same time, obviating the temporary uselessness of the latter, as is the case in a puncture or leak in the tire.

A further object is to provide a wheel which will take up both the horizontal and vertical thrusts against the outer rim of the wheel.

I also have for an object, to provide a construction which will readily admit of access to the resilient members, and to provide means whereby the members are positively held in place.

I attain these objects by positioning a certain form of elliptical spring in the channel formed between the inner and outer rims of the wheel.

With the above and other objects in view, as will more fully hereinafter appear, the present invention consists in certain novel details of construction and arrangement of parts hereinafter fully described, illustrated in the accompanying drawings, and more particularly pointed out in the appended claims.

In the accompanying drawings, forming part of this specification, the reference characters of which indicate corresponding parts in both the figures, Figure 1 is an elevation of my improved wheel, parts of which are broken away in order to show the spring connection; and Fig. 2 is a cross sectional view taken on the line 2—2 of Fig. 1 and looking in the direction of the arrow.

Referring to the drawings, attached to the outer periphery of the hub 1, is a pair of rings 2, L-shaped in cross section, and through one flange of each of which is passed bolts 3 connecting it with the hub 1. Fastened to the inner side of each of these rings 2, by bolts 2', is a pair of oppositely-disposed plates A and B, forming curved spoke members 4. These plates are fastened together at their outer ends and held by bolts 5. The plate A is turned outwardly to form a flange 6, and the other plate B is turned outwardly to form a flange 7 and is then again extended at right angles to the flange to form one side of a channel-forming member 8, which extends completely about the one face of the wheel. These two outwardly-turned flange members form an inner rim for the wheel.

Spaced apart from the channel-forming member 8 is a series of oppositely-disposed channel-forming plates 9, each plate having a flange 9' spaced inwardly from the edge 10 and abutting against the outer edge of the flange 6. These channel-forming members 9 may be of any desired number, fitting one against the other, to form the opposite face of the wheel, and are held in position by means of bolt-and-nut connections 11. Projecting inwardly into a channel 12 formed by the members 8 and 9, are lugs 13 and 14, which lugs fit into channels 15 in the side of the upper half 16 of the full elliptical spring 17. The lower leaf 18 of the spring 16, has each of its outer ends looped upon itself in order to carry pins 19 and 20. Pivoted to the pins 19 and 20 is one end of links 21 and 22, the other end of each of which is pinned at 23 and 24, to the scroll end 25 projecting from the lower half 26 of the full elliptical spring 17. This lower half 26 is slotted at 27, and into the opposite slots is disposed a yoke 28 passing through apertures 29 in the outer rim 30. This outer rim 30 may have a tire 31 of rubber or any suitable material, attached thereto, and into the U-shaped opening in the rim 30, a filler block 32 of wood or any other suitable material may be inserted between the rim 30 and the tire 31. It will be noted that this arrangement of spring members will permit of a free horizontal motion, while at the same time, the peculiar disposition of the link members between the two parts of the spring will permit of any horizontal thrust on the outer rim. Should it be desired to remove these springs, it is only necessary to take off the channel-forming members 9 by removing the bolt connection 11, and then by taking out one of the pins 19 or 20, the upper half of the spring can be drawn down out of engagement with the lugs 13 and 14. The outer half 26 could then be raised out of the U-shaped yoke 28, and thus the entire spring can be readily and quickly removed from the wheel.

As many changes could be made in the above construction and many apparently widely different embodiments of this invention could be made without departing from the scope thereof, it is intended that all matters contained herein in the above description or shown in the accompanying drawings shall be interpreted as illustrative and not in a limiting sense. It is also to be understood that the language used in the following claims is merely intended to cover all the generic and specific features of the invention herein described and all statements of the scope of the invention, which, as a matter of language, might be said to fall therebetween and that materials, sizes and relativities of parts are non-essential, except as called for in the claims.

Having thus described my invention, I claim as new and desire to secure by Letters Patent:

1. In a resilient wheel, an outer and an inner rim, pairs of lugs projecting from each of said rims, spaced-apart elliptical springs disposed between said rims and between the lugs of each pair, said springs comprising upper and lower leaves, a pin connection hinging said leaves together at their outer ends, whereby said pin may be withdrawn to disconnect said leaves.

2. In a resilient wheel, inner and outer rims concentrically disposed and spaced apart, lugs projecting from each of said rims into the space formed between the inner and outer rims, said lugs disposed in pairs transversely of said rims and arranged in diametrical alinement, and elliptical springs disposed between said rims, said springs having channels therein into which fit the said lugs, whereby said springs are removably retained in place.

In testimony whereof I have signed my name to this specification in the presence of two subscribing witnesses.

JOHN WOOD ENRIGHT.

Witnesses:
BERTRAND I. COHN,
BERNARD FITCHE.

Copies of this patent may be obtained for five cents each, by addressing the "Commissioner of Patents, Washington, D. C."